Dec. 20, 1960   G. C. PEARCE ET AL   2,965,095
VENTILATED SUPERPOSED OVENS
Filed Feb. 25, 1959
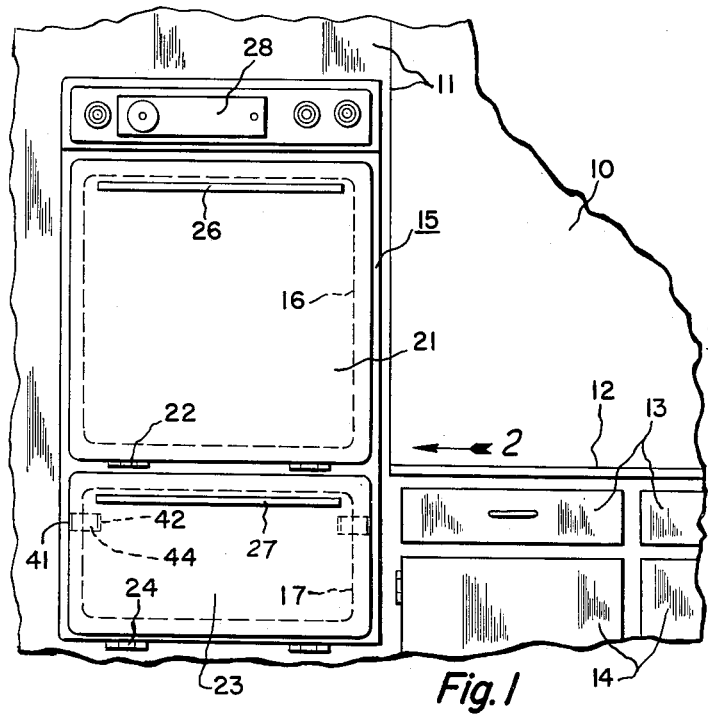
Fig. 1
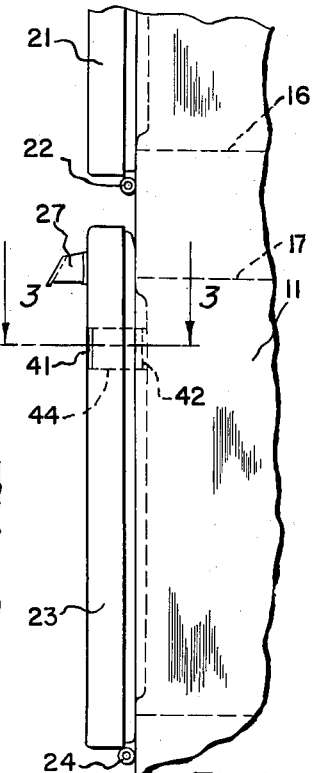
Fig. 2
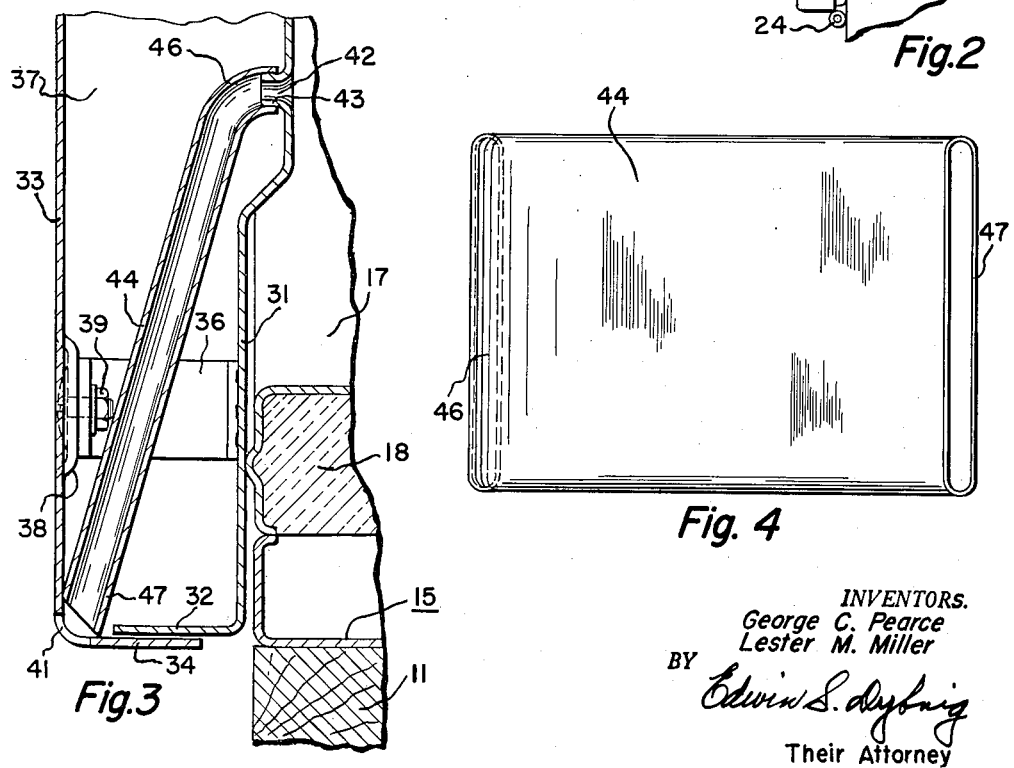
Fig. 3
Fig. 4
INVENTORS.
George C. Pearce
Lester M. Miller
BY Edwin S. Dybvig
Their Attorney

United States Patent Office 2,965,095
Patented Dec. 20, 1960

2,965,095

VENTILATED SUPERPOSED OVENS

George C. Pearce and Lester M. Miller, Dayton, Ohio, assignors to General Motors Corporation, Detroit, Mich., a corporation of Delaware Filed Feb. 25, 1959, Ser. No. 795,477

1 Claim. (Cl. 126—21)

This invention relates to cooking devices and particularly to a unitary structure built in or substantially enclosed by walls of a room provided with separate upper and lower ovens therein.

A problem exists in the use of unitary built-in wall ovens of the double oven type particularly wherein one oven is disposed above the other thereof. Generally such double oven wall type unitary structures include a larger upper oven for baking fowl or big food products and a smaller lower oven, the latter of which is apparently used more often for baking littler food products. Such oven structures built in or substantially enclosed by nonmetallic walls of a room or by walls of wooden cabinets in a kitchen are of necessity vented to the room through a vent provided in the exposed front portion of the structure, and therefore the vent for the lower oven is ordinarily located directly below a metallic door for the upper oven. When the lower oven is employed for baking, air heated therein escapes therefrom and flows through vent openings above its door into contact with the front face of the metal door for the upper oven. The metallic face of the upper oven door, particularly when the top oven is not heated, is much cooler than vented air escaping from vents in the front of the heated lower oven. The relatively cool metal front surface of the upper oven door is in the path of and exposed to moistened, rising, heated air being vented out of the lower oven, and juices or grease contained in this air condenses on the face of the upper oven door. As the moisture condensed on the face of the upper oven door evaporates or dries, the juice or grease content thereof deposits thereon and creates unsightly colored spots or blotches, thus necessitating frequent cleaning of the front surface of this upper door. Users of wall ovens of this type have complained about cleaning the front of the upper oven door after use of the lower oven for baking purposes, and more important it has, on several occasions, been necessary to replace the outer metal pan or panel of the upper oven door due to spots or blotches thereon permanently staining the door outer surface. The employment of a baffle or deflector which projects outwardly from a wall oven structure and extends horizontally between oven doors thereof, in addition to complicating the construction of the front of the structure, does not completely or satisfactorily overcome the difficulty because heated air from the lower oven at times and under certain conditions will still flow around such a deflector backwardly thereof and upwardly along and in contact with the front surface of a door for the upper oven. Consequently, we contemplate the provision of a new and novel venting means for a lower oven in a built-in wall double oven structure which eliminates customer complaints, the inconvenience, mess and expense involved in replacing door pans or panels.

An object of our invention is to provide an improved arrangement for venting an oven.

Another object of our invention is to provide an oven which is vented in a manner to prevent heated air escaping therefrom flowing over and in contact with metal or the like surfaces, controls, etc., located above the front portion of the oven.

A further object of our invention is to provide a built-in wall double oven unitary structure of the type having the upper oven door disposed above and substantially flush with the door of the lower oven thereof with a unique arrangement for venting air laterally out of the lower oven away from the front surface of the upper oven door.

A still further and more specific object of our invention is to vent the lower oven of a built-in wall double oven structure through a chamber formed between inner and outer pans or panels of the door for the lower oven toward sides of the structure to prevent the heated venting air from flowing over the front surface of a door for the upper oven in the structure.

Further objects and advantages of the present invention will be apparent from the following description, reference being had to the accompanying drawings wherein a preferred embodiment of the present invention is clearly shown.

In the drawing:

Figure 1 is a fragmentary view of a kitchen wall and cabinetwork showing a unitary oven structure mounted in the wall and having the present invention embodied in the structure;

Figure 2 is an enlarged fragmentary view taken in the direction of the arrow 2 in Figure 1 of the kitchen wall and oven structure therein;

Figure 3 is an enlarged fragmentary sectional view taken on the line 3—3 of Figure 2 showing a front corner of the lower oven and its door of the wall oven structure; and Figure 4 is a detailed view of a conduit employed in the present invention to vent an oven.

Referring to the drawing, we know in Figure 1 thereof a portion of a room such as a kitchen 10 having a wall 11, a work ledge or counter 12, sliding drawers 13 and doors 14 of a cabinet beneath the work ledge with its front substantially flush with the kitchen wall. Wall 11 has a cavity roughed therein and a unitary structure, generally represented by the reference character 15, is inserted or mounted in this cavity with the kitchen walls enclosing and concealing all sides of the structure 15 except its front which is exposed to the interior of the kitchen. The unitary structure 15 is a built-in wall oven of the type having a large liner forming an upper oven 16 and a smaller liner forming a lower oven 17 disposed therebelow and in vertical alignment with the upper oven. The liners of oven 16 and oven 17 are surrounded by any suitable or desirable insulating material 18 (see Figure 3) and are also insulated from one another. Upper oven 16 is provided with an access opening in its front face and a metal faced closure member 21 pivotally mounted at its bottom edge, by hinges 22, on structure 15 normally closes this opening of the upper oven while a separate and independently operated closure member or door 23 pivotally mounted at its bottom edge, by hinges 24, on structure 15 closes the access opening in the front face of lower oven 17. The closure member 21 and door 23 are provided with handles 26 and 27 respectively to facilitate movements thereof in obtaining access to the ovens 16 and 17. Any suitable or conventional devices or mechanisms for counterbalancing movements of closure member 21 and door 23 and for stopping their opening swinging movement in a horizontal plane at the front of ovens 16 and 17 may be associated with the unitary structure 15. Such mechanisms or devices are well known to those skilled in the art and since they form no essential part of the present invention the mechanisms are not herein disclosed. Each oven 16 and 17 is provided with an upper broiling electric heater unit and a lower baking electric heater unit (not shown) as is conventional in the art so that either oven may be employed for both baking food products and/or for broiling food products therein. Any suitable or desirable controls for the bake and broil heater units of ovens 16 and 17 may be mounted on a control panel 28 above oven 16 to form a part of the unitary structure 15. These controls may be operated to independently or simultaneously energize any of the heater units and/or to regulate the period of time of energization thereof. Since the structure 15 is built into walls 11 of the room or kitchen 10, the liner of oven 16 is impervious or extends continuously throughout a box-like form and this oven must, of necessity, be vented at the front of the structure to air within the kitchen. The upper oven 16 may be vented in any desired or conventional manner to the room or kitchen; but lower oven 17 is, in the present disclosure, vented in a special or novel manner so as to accomplish the objects of our invention as hereinbefore enumerated.

Accordingly, and by reference particularly to Figure 3 of the drawing, it will be noted that door 23 of lower oven 17 includes an inner metal pan-like member 31, having a peripheral flange 32, and an outer metal pan-like member 33, having a peripheral flange 34. Outer member 33 of door 23 has a plurality of spaced apart spacer cleats or brackets 36 secured thereto as by welding; and when the pan-like members 31 and 33 are assembled to one another, the flange 32 on member 31 fits into the flange 34 on member 33 and the reenforcing brackets or cleats 36 space the pan-like members apart to provide a chamber 37 therebetween. Telescoped together flanges 32 and 34 on the pan-like members of door 23 are disposed perpendicular to and extend forwardly of the front face of oven 17. Door chamber 37 may, if desired, contain a suitable insulating material. Inner door pan member 31 has round indented or recessed portions 38 provided with a hole therein through which a bolt 39 is extended and clamped to a leg of a bracket 36 for rigidly securing the inner and outer door pan members together. Each peripheral upright side edge of door 23 has a vertically elongated aperture or slot 41 therein and this aperture is, in the present disclosure, provided in outer pan-like member 33 at the vertical side corners thereof from which the flange 34 extends. At least a portion of each aperture 41 is, for the purpose of our invention, located in the perpendicular upright side edges of door 23. The inner pan-like member 31 of door 23 has a pair of spaced apart vertically elongated openings 42 therein, the walls of which are bent or flared inwardly of door 23 as at 43. A flat or substantially oval-shaped metal tube or conduit 44 has walls at a bent end 46 thereof telescoped over and welded to the flared walls 43 of openings 42 to secure the conduit to inner pan-like member 31 within chamber 37 of door 23. Conduit 44 extends angularly within door chamber 37 with its other end 47, opposite the bent secured end 46 thereof, terminating in spaced relation to and registering with the aperture 41 at the peripheral side edge of door 23. This conduit 44 is, of course, welded in place as shown and described to pan-like member 31 prior to assembling and securing the members 31 and 33 to one another. It is to be noted that a conduit 44 is located at each side of door 23. The spaced apart conduits 44 form, in the present disclosure, means for venting the lower oven 17 through door 23 to room or kitchen 10 while this door is closed tightly against a front surface or door jamb portion of oven 17 in the structure 15. The conduits 44 are disposed in chamber 37 of door 23 and are therefore concealed within the confines, pan-like members 31 and 33, of the door and communicate at their end 46 with the interior of oven 17 and at their other end 47 with the aperture or slot 41.

During a period of time in which baking of food products is carried out in lower oven 17, particularly when upper oven 16 is not heated, door 23 is closed against the structure 15; and the conduits 44 are effective for venting heated air out of oven 17. Air being vented out of oven 17 will, depending upon the character of foods baked therein, be laden with moisture containing juices or grease; and this air creates the aforementioned difficulties which are substantially eliminated by the present invention. The heated, moist air escapes from the closed oven 17 through openings 42, in the inner pan-like member 31 of door 23, and is conveyed therefrom by vent conduits 44 which direct the air out of aperture 41. Moist, vented, heated air is discharged by conduits 44 and apertures 41 laterally away from the front face of upper oven closure member 21 over or along nonmetallic surfaces of the kitchen wall or cabinets adjacent structure 15 which surfaces are less likely to cause condensation of moisture out of the heated air and concentration of resultant constituents thereof. Thus the lower even 17 is vented through chamber 37 in door 23 outwardly away from closure member 21 so that the venter air will not flow upwardly over and in contact with the relatively cool metal front surface of the closure member 21 whereby juices or grease contained therein is prevented from condensing thereon.

It should be apparent that we have in this manner provided an improved venting arrangement for the lower oven of a built-in double oven wall structure and have eliminated objections to the use and care of such a wall type oven. By preventing condensation of moisture, juices and grease from air vented out of a lower oven of a built-in wall double oven and its deposit or accumulation at a concentrated or local point, we avoid staining of the front surface of a closure member for an upper oven therein to thereby eliminate discoloration thereof and the ultimate necessity of replacing the front panel of such members. The venting arrangement herein disclosed is less expensive to incorporate in a double oven wall structure and is considerably more effective and satisfactory than trim strip or ledge-like air deflectors or baffles exposed at the front of the structure and required to be plated and highly polished. In preventing condensation of moisture on the face of a door for an upper oven, above a door for a lower oven of a double oven wall structure, we also eliminate drippage of condensate onto the lower door, front surfaces of the structure immediately adjacent this door and/or onto the kitchen floor to thus avoid another criticism in the use of built-in wall oven.

While the embodiment of the present invention as herein disclosed, constitutes a preferred form, it is to be understood that other forms might be adopted.

What is claimed is as follows:

In combination, a unitary structure adapted to be mounted in and enclosed on all sides except its front face by walls of a room, said structure being provided with an insulated upper oven and an insulated lower oven located below and isolated from the upper oven, each of said ovens having an opening in the front face of said structure providing access thereto from within a room, a closure member for the access opening of said upper oven, a door for the access opening of said lower oven, said closure member and said door being disposed in vertical alignment with their fronts substantially flush with one another and being independently movable to selectively open the ovens, said door including walls at least one of which forms an upright peripheral side edge thereof disposed perpendicular to and extending forwardly from the front face of said unitary structure, means for venting said lower oven through said door to a room while the door is closed against said front face of the structure, said venting means comprising a conduit carried by and concealed within walls of said door, and said conduit communicating at one end thereof with the interior of said lower oven and having its other end registering with an aperture provided in a portion of said upright perpendicular door side edge to direct air heated in the lower oven laterally away from said door whereby to prevent flow of the heated air egressing therefrom over said upper oven closure member.

References Cited in the file of this patent

UNITED STATES PATENTS

| | | |
|---|---|---|
| 381,101 | Beecher | Apr. 17, 1888 |
| 1,502,172 | Carbery | July 22, 1924 |
| 2,349,541 | Earle | May 23, 1944 |
| 2,823,664 | Evans et al. | Feb. 18, 1958 |
| 2,889,825 | Evans | June 5, 1959 |
| 2,918,916 | Nelson | Dec. 22, 1959 |